United States Patent [19]

Kimura et al.

[11] Patent Number: 5,099,108
[45] Date of Patent: Mar. 24, 1992

[54] ELECTRIC CONTROL SYSTEM FOR LIQUID HEATING APPARATUS OF THE PULSE COMBUSTION TYPE

[75] Inventors: Makoto Kimura, Inazawa; Yasuhiko Tabuchi, Sapporo; Mitsutoshi Kimura, Nagoya, all of Japan

[73] Assignee: Paloma Kogyo Kabushiki Kaisha, Nagoya, Japan

[21] Appl. No.: 462,600

[22] Filed: Jan. 9, 1990

[30] Foreign Application Priority Data

Jan. 10, 1989 [JP] Japan ................................ 1-1491

[51] Int. Cl.⁵ .............................................. H05B 1/02
[52] U.S. Cl. .................................. 219/497; 219/501; 219/506; 219/494; 340/589
[58] Field of Search .............. 219/506, 494, 497, 499, 219/501, 508, 505, 491, 442, 443, 485; 340/588, 584, 589

[56] References Cited

U.S. PATENT DOCUMENTS

| | | | |
|---|---|---|---|
| 4,524,264 | 6/1985 | Takeuchi et al. | 219/497 |
| 4,587,406 | 5/1986 | Andre | 219/497 |
| 4,655,041 | 4/1987 | Del Vecchio et al. | 340/588 |
| 4,812,625 | 3/1989 | Ceste, Sr. | 219/497 |
| 4,845,341 | 7/1989 | Rae . | |
| 4,883,944 | 11/1989 | Takano et al. | 340/589 |

FOREIGN PATENT DOCUMENTS 2635640 3/1977 Fed. Rep. of Germany ...... 340/589

*Primary Examiner*—Mark H. Paschall
*Attorney, Agent, or Firm*—Fleit, Jacobson, Cohn, Price, Holman & Stern

[57] ABSTRACT

A liquid heating apparatus includes a pulse combustion burner mounted to a liquid vessel and having a combustion chamber secured to a side wall of the vessel and immersed in liquid in the vessel, a tailpipe connected at its one end to an exhaust port of the combustion chamber and immersed in the liquid, and a fuel supply conduit in communication with the combustion chamber and being provided thereon with an electrically operated valve which is closed in a deactivated condition to interrupt the supply of fuel into the combustion chamber and opened in an activated condition to permit the supply of fuel into the combustion chamber. An electric control system for the heating apparatus is arranged to detect an instant temperature of the liquid, to memorize a standard rise rate of temperature determined to be smaller than a rise rate of the instant temperature in a condition where a sufficient amount of liquid is stored in the vessel and to be larger than the rise rate of the instant temperature in a condition where there is not any liquid in the vessel, to compare the rise rate of the instant temperature with the standard rise rate and to produce an output signal for deactivation of the valve when the rise rate of the instant temperature is smaller than the standard rise rate.

3 Claims, 2 Drawing Sheets

ELECTRIC CONTROL SYSTEM FOR LIQUID HEATING APPARATUS OF THE PULSE COMBUSTION TYPE

BACKGROUND OF THE INVENTION

1. Field of the Invention

The present invention relates to a liquid heating apparatus of the pulse combustion type, and more particularly to a liquid heating apparatus which includes means for preventing the pulse combustion burner from its careless activation in a condition where there is not any liquid in the vessel.

2. Description of the Prior Art

In general, a conventional liquid heating apparatus of the pulse combustion type includes a liquid vessel arranged to store an amount of liquid such as cooking oil or other fluid medium to be heated, a pulse combustion burner mounted to the vessel and having a combustion chamber secured at its inlet end to a side wall of the vessel and immersed in the liquid, and a tailpipe connected at one end thereof to an exhaust port of the combustion chamber in such a manner that the great part of the tailpipe is immersed in the liquid. The conventional liquid heating apparatus, however, does not act to automatically prevent the pulse combustion burner from its careless activation in a condition where there is not any liquid in the vessel. It is, therefore, needed in use to confirm as to whether a sufficient amount of liquid is stored in the vessel or not prior to activation of the burner. If the burner is carelessly activated without any liquid in the vessel, the component parts of the heating apparatus will be damaged due to overheat of the burner.

To avoid such careless activation of the burner, a liquid level detection switch may be provided within the vessel to maintain the burner in its deactivated condition when it has been detected that the level of stored liquid in the vessel is below a predetermined minimum level. The provision of the detection switch, however, results in an increase of manufacturing cost of the heating apparatus.

SUMMARY OF THE INVENTION

In the conventional heating apparatus of this kind, a temperature sensor is provided to detect an instant temperature of liquid in the vessel. The inventors have found the fact that the rise rate of temperature detected by the sensor is maintained in a relatively large value in a condition where a sufficient amount of liquid is stored in the vessel and that the rise rate of temperature becomes small in a condition where there is not any liquid in the vessel. On a basis of the above fact, the present invention is directed to provided an improved liquid heating apparatus of the pulse combustion type wherein the temperature sensor is utilized to prevent the pulse combustion burner from its careless activation in a condition where there is not any liquid in the vessel.

According to the present invention, there is provided a liquid heating apparatus of the pulse combustion type which includes a liquid vessel arranged to store an amount of liquid such as cooking oil or other fluid medium to be heated, a pulse combustion burner mounted to the vessel and having a combustion chamber secured at its inlet end to a side wall of the vessel and immersed in the liquid, a tailpipe connected at one end thereof to an exhaust port of the combustion chamber and immersed in the liquid, and a fuel supply conduit in communication with the combustion chamber of the burner and being provided thereon with an electrically operated valve which is closed in a deactivated condition to interrupt the supply of fuel into the combustion chamber and opened in an activated condition to permit the supply of fuel into the combustion chamber, wherein an electric control system for the liquid heating apparatus comprises a temperature sensor arranged to detect an instant temperature of the liquid in the vessel, memory means for memorizing a standard rise rate of temperature detemined to be smaller than a rise rate of the instant temperature detected by the sensor in a condition where a sufficient amoun of liquid is stored in the vessel and to be larger than the rise rate of the instant temperature in a condition where there is not any liquid in the vessel, and means for comparing the rise rate of the instant temperature with the standard rise rate and for producing an output signal for deactivation of the electrically operated valve when the rise rate of the instant temperature is smaller than the standard rise rate.

BRIEF DESCRIPTION OF THE DRAWINGS

Additional objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
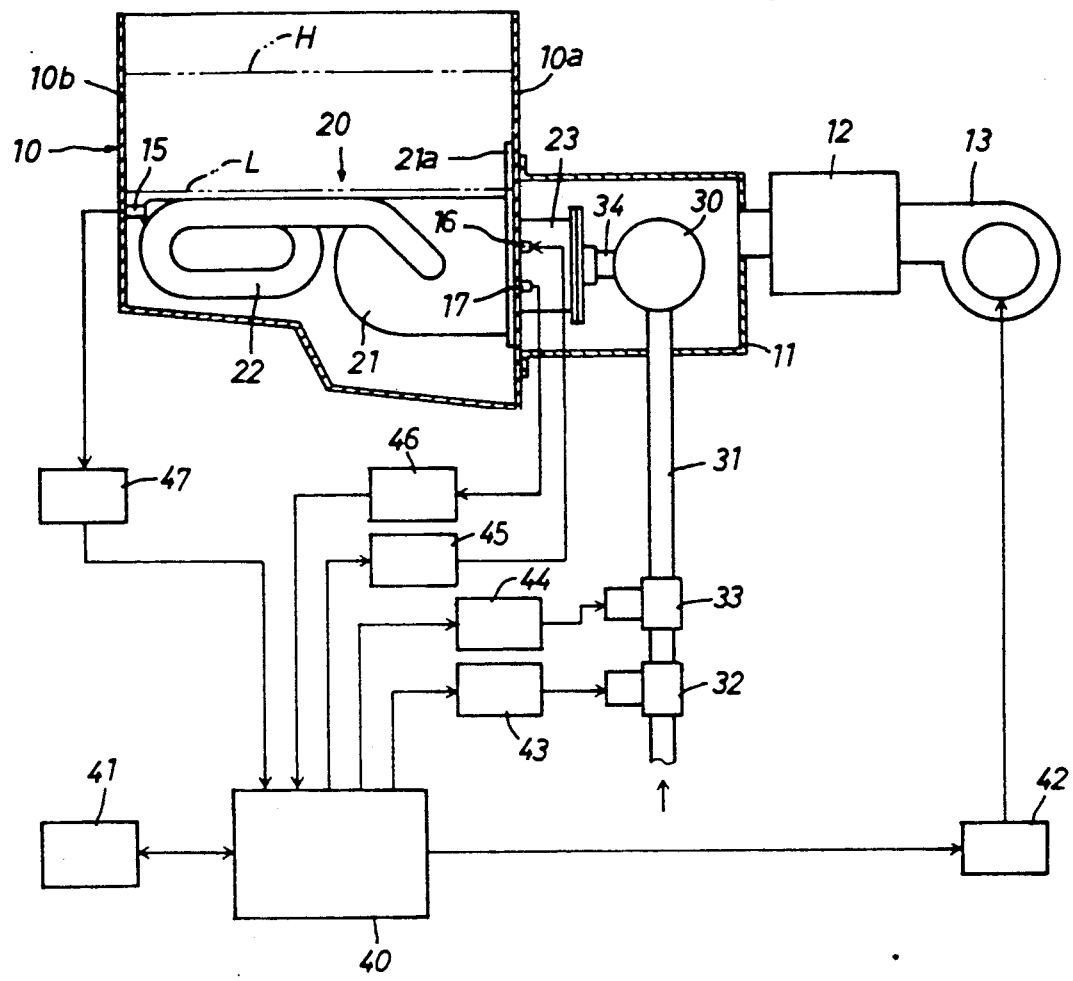
FIG. 1 is a block diagram of an electric control system for a liquid heating apparatus of the pulse combustion type.
Figure 2:
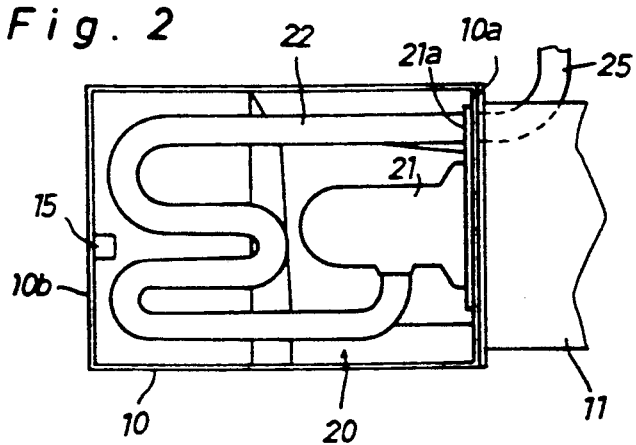
FIG. 2 is a plan view of the heating apparatus shown in FIG. 1.

In FIGS. 1 and 2 of the drawings there is illustrated a liquid heating apparatus in the form of a deep fat fryer which includes an open top liquid vessel 10 of generally rectangular in shape arranged to store an amount of cooking oil or other fluid medium to be heated. A pulse combustion burner assembly 20 is mounted to an upright forward side wall 10a of vessel 10 and immersed in liquid in the vessel 10. The pulse combustion burner assembly 20 includes, as main components, a combustion chamber 21, a tailpipe 22 and an air-fuel mixer head 23. The combustion chamber 21 is integrally formed at its inlet end with an attachment flange 21a which is secured to an internal surface of side wall 10a through a gasket in a liquid-tight manner by means of screws. The tailpipe 22 has an inner end welded to an exhaust port of the combustion chamber 21 in a liquid-tight manner and is sinuously housed in the vessel 10. As shown in FIG. 2, the tailpipe 22 extends outwardly through the attachment flange 21a of combustion chamber 21 and forward side wall 10a of vessel 10 and has an outer end portion welded to the attachment flange 21a in a liquid-tight manner and connected to an extension pipe 25 which is connected to an exhaust muffler (not shown) to exhaust therethrough combustion products from the tailpipe 22 to the atmospheric air.

The air-fuel mixer head 23 is fixedly mounted to the attachment flange 21a of combustion chamber 21 through the forward side wall 10a of vessel 10 and is in open communication with the interior of combustion chamber 21 through an opening in attachment flange 21a to supply a mixture of gaseous fuel and air. The combustion chamber 21 is provided with a spark plug 16 and a flame rod 17 which are inserted into the interior of combustion chamber 21 through the forward side wall 10a and attachment flange 21a. A temperature sensor 15 in the form of a thermister is attached to an internal surface of an upright rearward side wall 10b of vessel 10 to detect a temperature of cooking oil stored in the vessel 10. In FIG. 1, the reference character H indicates an uppermost level of cooking oil in the vessel 10, while the reference character L indicates a lowermost level of cooking oil which is defined in a position slightly higher than the pulse combustion burner assembly 10 and temperature sensor 15.

The air-fuel mixer head 23 is housed in an air chamber casing 11 which is fixedly mounted to the forward side wall 10a of vessel 10 in an air-tight manner. An air intake muffler 12 is connected at its one end to the air chamber casing 11 and at its other end to an electrically operated air blower 13 to supply fresh air into the interior of air chamber casing 11 therefrom. The air-fuel mixer head 23 is provided at one side thereof with an air intake flapper valve (not shown) for permitting only the flow of fresh air into the mixer head 23. A gas container 30 housed in the air chamber casing 11 is connected to a source of gaseous fuel (not shown) by means of a gas supply conduit 31 which extends outwardly from the container 30 through a peripheral wall of air chamber casing 11. The gas supply conduit 31 is provided thereon with electromagnetic valves 32 and 33 for control of the gaseous fuel supplied therethrough into the gas container 30. The gas container 30 is also connected to the air-fuel mixer head 23 by means of a communication pipe 34 which is provided therein with a gas intake flapper valve (not shown) for permitting only the flow of gaseous fuel supplied therethrough into the mixer head 23. In this embodiment, the electromagnetic valves 32 and 33 each are arranged to be closed in their deenergized conditions and to be opened in their energized conditions.

Figure 3:
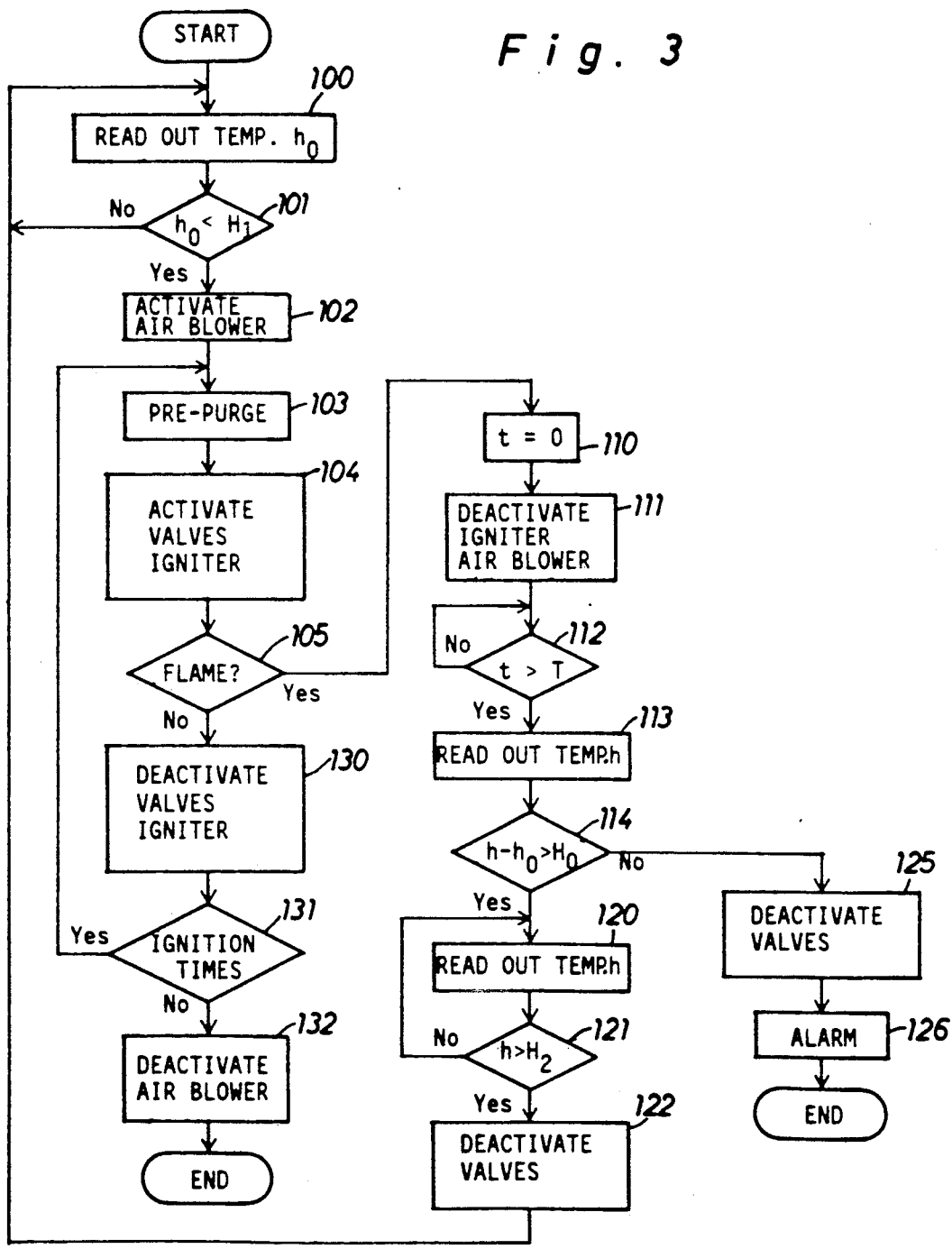
FIG. 3 is a flow chart of a control program executed by a central processing unit shown in FIG. 1.

An electric control system for the heating apparatus comprises a microcomputer 40 which includes a central processing unit or CPU, a read-only memory or ROM, a random access memory or RAM and an interface. The CPU of computer 40 is connected through the interface to driving circuits 42, 43 and 44 respectively for control of the air blower 13 and electromagnetic valves 32, 33 and is further connected through the interface to an igniter 45 for control of the spark plug 16. The CPU of computer 40 is further connected through the interface to a remote controller 41, a flame detection circuit 46 and a temperature detection circuit 47. The remote controller 41 includes a main switch for selectively activating or deactivating the electric control system, a temperature setting switch and the like (not shown). The flame detection circuit 46 is connected to the flame rod 17 to detect presence of a flame in the combustion chamber 21, and the temperature detection circuit 47 is connected to the temperature sensor 15 to detect an instant temperature of cooking oil in the vessel 10. The ROM of computer 40 is arranged to memorize a control program for controlling operation of the heating apparatus and to memorize constants necessary for execution of the program. The RAM of computer 40 is arranged to temporarily memorize various kinds of variables. The CPU of computer 40 is programmed to execute the control program in response to input signals from the remote controller 41 and detection circuits 46, 47 thereby to produce output signals for control of the electromagnetic valves 32, 33, air blower 13 and igniter 45 as will be described in detail hereinafter with reference to the flow chart shown in FIG. 3.

Assuming that the main switch of remote controller 41 is turned on to activate the electronic control system, the CPU of computer 40 resets each of previously memorized variables to 0 or an initial value to initiate execution of the control program. At step 100, the CPU of computer 40 reads out an initial temperature ho detected by the temperature sensor 25 and causes the program to proceed to step 101 where the CPU of computer 40 compares the initial temperature ho with a predetermined lower limit value $H_1$ (for example, 170° C.) of the cooking oil. When the CPU of computer 40 determines a "Yes" answer at step 101, the program proceeds to step 102 where the CPU of computer 40 produces an output signal for activation of the air blower 13. At the following step 103, the CPU of computer 40 causes the air blower 13 to effect pre-purge of the pulse combustion burner 20 for a predetermined time (for example, 80 seconds). Thereafter, at step 104, the CPU of computer 40 produces output signals for activation of the electromagnetic valves 32, 33 and igniter 45. When applied with the output signals from computer 40, the electromagnetic valves 32 and 33 are opened to supply the gaseous fuel into the gas container 30, and the igniter 45 energizes the spark plug 16 to ignite a mixture of gaseous fuel and air supplied into the combustion chamber 21 from the mixer head 23.

At step 105, the CPU of computer 40 is applied with an input signal from flame detection circuit 46 to ascertain presence of a flame in the combustion chamber 21. If the answer at step 105 is "No", the program proceeds to step 130 where the CPU of computer 40 produces output signals for deactivation of the electromagnetic valves 32, 33 and igniter 45. Thus, the electromagnetic valves 32, 33 are closed to interrupt the supply of gaseous fuel into the gas container 30, and the igniter 45 deenergizes the spark plug 16. Until the "No" answer is determined three times at step 105, the CPU of computer 40 will repeat the execution at steps 103 to 130 to cause ignition of the mixture in the combustion chamber 21. If the "No" answer is further determined at step 105, the program will proceed to step 132 where the CPU of computer 40 produces an output signal for deactivation of the air blower 13 and an alarm signal for activation of an alarm lamp or buzzer (not shown).

When the CPU of computer 40 determines a "Yes" answer at step 105, the program proceeds to step 110 where the CPU of computer 40 resets a time t to 0. At the following step 111, the CPU of computer 40 produces output signals for deactivation of the igniter 45 and air blower 13 and causes the program to proceed to step 112. When a predetermined time T (for example, 1 minute) lapses after detection of the flame at step 105, the CPU of computer 40 determines a "Yes" answer at step 112 and causes the program to proceed to step 113. At step 113, the CPU of computer 40 reads out an instant temperature h detected by sensor 15 to compare the rise rate of temperature h–ho with a standard rise rate of temperature Ho memorized in the ROM, at step 114.

The rise rate of temperature h–ho will vary with the quantity and temperature of stored cooking oil as described below. In the case that the deep fat fryer is filled with the cooking oil of 18-10 liter and has a heating capacity of 10,000 kal/hour for heating the cooking oil up to a highest temperature of 200° C., the rise rate of temperature h-ho is maintained above 5° C./minute. If the combustion burner is activated without any liquid in the vessel 10, the temperatures of combustion chamber 21 and tailpipe 22 rapidly rise. However, the rise rate of temperature h-ho is maintained below 5° C./minute since the mounting portion of sensor 15 is spaced from the mounting portion of combustion chamber 21 and the tailpipe 22. For this reason, the standard rise rate of temperature Ho is determined to be smaller than the rise rate of instant temperature h-ho in a condition where a sufficient amount of liquid is stored in the vessel 10 and to be larger than the rise rate of instant temperature h—ho in a condition where there is not any liquid in the vessel 10. In a practical embodiment of the present invention, it is not necessary to define the standard rise rate of temperature Ho as a single value. The standard rise rate of temperature Ho may be defined as a plurality of values which are decreased in accordance with rise of instant temperatures detected by sensor 15.

Assuming that the level of stored cooking oil is maintained above the lowermost level L during execution of the program at step 114, the CPU of computer 40 determines a "Yes" answer and causes the program to proceed to step 120. At step 120, the CPU of computer 40 reads out an instant temperature h detected by sensor 15 to compare the instant temperature h with an upper limit value $H_2$ (for example, 180° C.). Until the instant temperature h rises up to the upper limit value $H_2$, the pulse combustion burner 20 is maintained in its activated condition under control of the CPU of computer 40 to heat the cooling oil. When the instant temperature h exceeds the upper limit value $H_2$, the CPU of computer 40 determines a "Yes" answer at step 121 and causes the program to proceed to step 122. At step 122, the CPU of computer 40 produces output signals for deactivation of the electromagnetic valves 32 and 33. When applied with the output signals from computer 40, the electromagnetic valves 32, 33 are closed to deactivate the pulse combustion burner 20, and the program is returned to step 100. When the instant temperature h detected by sensor 15 drops below the lower limit value $H_1$, the CPU of computer 40 determines a "Yes" answer at step 101 to repeat execution of the program in the same manner as described above thereby to activate the pulse combustion burner 20. As a result, the temperature of cooking oil in vessel 10 is maintained between the lower and upper limit values $H_1$ and $H_2$.

Assuming that there is not any cooking oil in the vessel 10 during execution of the program at step 114, the CPU of computer 40 determines a "No" answer and causes the program to proceed to step 125. At step 125, the CPU of computer 40 produces output signals for deactivation of the electromagnetic valves 32, 33 and produces an alarm signal therefrom at the following step 126. Thus, the electromagnetic valves 32, 33 are closed to deactivate the pulse combustion burner 20, and the user is informed of an abnormal condition of the heating apparatus. In case the level of stored cooking oil is reduced below the temperature sensor 15 during execution of the program at step 114, the CPU of computer 40 determines a "No" answers and causes the program to proceed to step 125. In this instance, the pulse combustion burner 20 is deactivated in the same manner as described above.

From the above description, it will be understood that the temperature sensor 15 is effectively utilized to prevent overheat of the combustion burner 20 in careless use without providing any additional sensor.

Although the preferred embodiment of the present invention has been shown and described, it should be understood that various modifications and rearrangements may be resorted to without departing from the scope of the invention as disclosed and claimed herein.

What is claimed is:

1. An electric control system for a liquid heating apparatus of the pulse combustion type including a liquid vessel arranged to store an amount of liquid such as cooking oil or other fluid medium to be heated; a pulse combustion burner mounted to said vessel and having a combustion chamber secured at an inlet end thereof to a side wall of said vessel and immersed in the liquid; a tailpipe connected at one end thereof to an exhaust port of the combustion chamber and immersed in the liquid; and a fuel supply conduit in communication with a combustion chamber of said burner and being provided thereon with an electrically operated valve which is closed in a deactivated condition to interrupt the supply of fuel into the combustion chamber and opened in an activated condition to permit the supply of fuel into the combustion chamber;

wherein the electric control system for the heating apparatus comprises a temperature sensor arranged to detect an instant temperature of the liquid in said vessel; memory means for memorizing a standard rate of temperature rise determined to be smaller than a rate of rise of the instant temperature detected by said sensor in a condition where a sufficient amount of liquid is stored in said vessel and to be larger than the rate of the rise of the instant temperature in a condition where there is no liquid in said vessel; means for comparing the rate of rise of the instant temperature with the standard rate of temperature rise and for producing an output signal therefrom when the rate of rise of the instant temperature is smaller than the standard rate of temperature rise; and means for deactivating said electrically operated valve in response to the output signal applied thereto.

2. An electric control system as recited in claim 1, further comprising means for comparing the instant temperature with an upper limit value defining a highest temperature of the liquid and for producing a second output signal therefrom when the instant temperature exceeds the upper limit value; and means for deactivating said electrically operated valve in response to the second output signal applied thereto.

3. An electric control system as recited in claim 1, further comprising means for producing an alarm signal when the rate of rise of the instant temperature is smaller than the standard rate of rise in temperature.

* * * * *